US00RE41429E

(19) United States
(12) Reissued Patent
Yen et al.

(10) Patent Number: US RE41,429 E
(45) Date of Reissued Patent: Jul. 13, 2010

(54) WRITE STRATEGY FOR OPTICAL RECORD CARRIER

(75) Inventors: Meng-Shin Yen, Taoyuan (TW); Lester Chen, Taoyuan (TW); Shih-Chieh Lee, Taoyuan (TW)

(73) Assignee: QISDA Corporation, Taoyuan (TW)

(21) Appl. No.: 11/264,812

(22) Filed: Nov. 2, 2005

Related U.S. Patent Documents

Reissue of:
(64) Patent No.: 6,643,233
Issued: Nov. 4, 2003
Appl. No.: 09/684,144
Filed: Oct. 5, 2000

(30) Foreign Application Priority Data

Oct. 6, 1999 (TW) ..... 88117198

(51) Int. Cl.
*G11B 7/00* (2006.01)

(52) U.S. Cl. ..... 369/47.15; 369/47.44; 369/47.51; 369/53.12

(58) Field of Classification Search ..... 369/47.15, 369/47.44, 47.51, 53.12, 53.13, 53.15, 47.55, 369/53.26, 275.3, 44.26, 44.32, 47.27, 47.28, 369/53.22, 53.14, 53.16, 53.38, 53.27
See application file for complete search history.

(56) References Cited

U.S. PATENT DOCUMENTS

| | | | | | |
|---|---|---|---|---|---|
| 5,623,470 | A | * | 4/1997 | Asthana et al. | 369/58 |
| 5,675,568 | A | * | 10/1997 | Hajjar et al. | 369/116 |
| 5,684,765 | A | * | 11/1997 | Matsumoto et al. | 369/13 |
| 6,097,683 | A | * | 8/2000 | Ohara et al. | 369/53.22 |
| 6,141,306 | A | * | 10/2000 | Andoh | 369/53.35 |
| 6,263,469 | B1 | | 7/2001 | Jang | 714/775 |
| 6,377,527 | B1 | * | 4/2002 | Hirashima | 369/53.23 |
| 6,552,983 | B1 | | 4/2003 | Yoshida et al. | 369/53.12 |
| 6,557,141 | B1 | | 4/2003 | Gill et al. | 714/771 |
| 6,606,286 | B1 | | 8/2003 | Maekawa | 369/47.17 |

* cited by examiner

*Primary Examiner*—Nabil Z Hindi
(74) *Attorney, Agent, or Firm*—Birch, Stewart, Kolasch & Birch, LLP

(57) ABSTRACT

The invention provides a reliable write method of data on an optical record carrier without changing the conventional configuration of an information recording apparatus. The invention uses the errors occurred in reading ATIP codes and/or the reflected signal from the surface of the record carrier to decide if the storage unit on the record carrier is eligible to store data. The defective storage units are labeled as unrecordable.

23 Claims, 5 Drawing Sheets

WRITE STRATEGY FOR OPTICAL RECORD CARRIER

Matter enclosed in heavy brackets [ ] appears in the original patent but forms no part of this reissue specification; matter printed in italics indicates the additions made by reissue.

FIELD OF THE INVENTION

The present invention relates to a method of writing data on an optical record carrier such as a CD-R (compact disk recordable), a CD-RW (compact disk rewritable), a MO-disk (magneto-optical disk), and the like.

BACKGROUND OF INVENTION

In a state-of-art record carrier, such as CD-R, CD-RW or MO disk, a wobbled pregroove is typically provided for marking ATIP (absolute time in pregroove) codes. The ATIP codes provide a basis for the data recording apparatus to read or write information on the record carrier. The prior arts regarding the wobbled pregroove and ATIP codes may be found in the U.S. Pat. No. 5,226,027 and "Orange Book", 3rd edition, published by Philip corp. in 1997.

However, based on the prior arts, writing error and interruption still occur during writing of data on the record carrier. So a portion of or entire record carrier cannot be read due to the writing errors. The major possible reasons for the unsuccessful recording of data on the storage unit of record carrier include the defects, scratches and stains which are not detected prior to the writing of data.

These reasons are described summarily as follows. (1) Wrong ATLP codes with inconsistent CIRC checksum are marked on the record carrier. (2) Format not complying with the standard format specified in "Orange Book". (3) Scratches are accidentally made over the substrate of the record carrier after the manufacture of the record carrier. (4) The finger print, dust and stains imposed over the record carrier after the manufacture of the record carrier. (5) The scratches are made over the reflective layer of the record carrier after the manufacture of the record carrier.

Aforesaid defects of (1), (2) affect the quality of the record carrier significantly and defect in (2) mainly results from the issues of material and procedure control during the manufacturing. The defects due to the reason (2) can not be easily detected by the reflected signal from the surface of record carrier. However, by detecting error occurred in reading ATIP codes, the detection of the defects of (1) and (2) can be accomplished easily. Moreover, the detection of ATIP codes can be implemented by using the current information record system. Therefore, detecting of ATIP codes can be used as index indicative of the quality of record carrier.

The defects of (3), (4) and (5) can be detected by the reflected signal from the surface of the record carrier.

SUMMARY OF INVENTION

Accordingly, an objective of the present invention is to provide a method of write data over an optical record carrier employing the pregroove and ATIP code. The invention is to successfully detect the storage units, on the record carrier, on which data can not be written. Furthermore, the storage units, on which data can not be written due to defects, scratches and stains, are labeled as unrecordable.

Another objective of the invention is to provide a reliable write method of data over an optical record carrier without changing the configuration of an information recording apparatus. The invention is implemented by detecting the error occurring in reading ATIP codes and the reflected signal from the surface of the record carrier.

According to a first preferred embodiment of the invention, a method is provided for writing data on a storage unit of a record carrier having a pregroove on which a predetermined ATIP codes are marked. A predetermined sets of number-ranges are defined. Each set of number-range corresponds to a write speed and a write power used to write data on the storage unit. The method includes the steps of:

(1) reading the pregroove ATIP codes from the servo track of the storage unit;

(2) generating an error-count by analyzing the decoded ATIP codes from the corresponding storage unit;

(3) determining whether the error-count obtained falls within one set of number-range; and

(31) if No in step (3), labeling the storage unit as unrecordable;

(32) if YES in step (3), writing data on the-storage unit based on the write speed and the write power corresponding to the one set of number-range.

The error-count of the decoded ATIP is the accumulated number of occurrences of either one of the following errors: (a) the CIRC checksum of the decoded ATIP code is error, but can be corrected; (b) the CIRC checksum of the decoded ATIP code is error, and can not be corrected; and (c) the min/sec/frame time value is not continued between two consecutive storage units.

The advantage and spirit of the invention may be understood by the following recitations together with the appended drawings.

BRIEF DESCRIPTION OF THE APPENDED DRAWINGS

FIG. 1 is a block diagram of an information recording apparatus which the invention can be applied to.

DETAILED DESCRIPTION OF THE INVENTION

Figure 1:
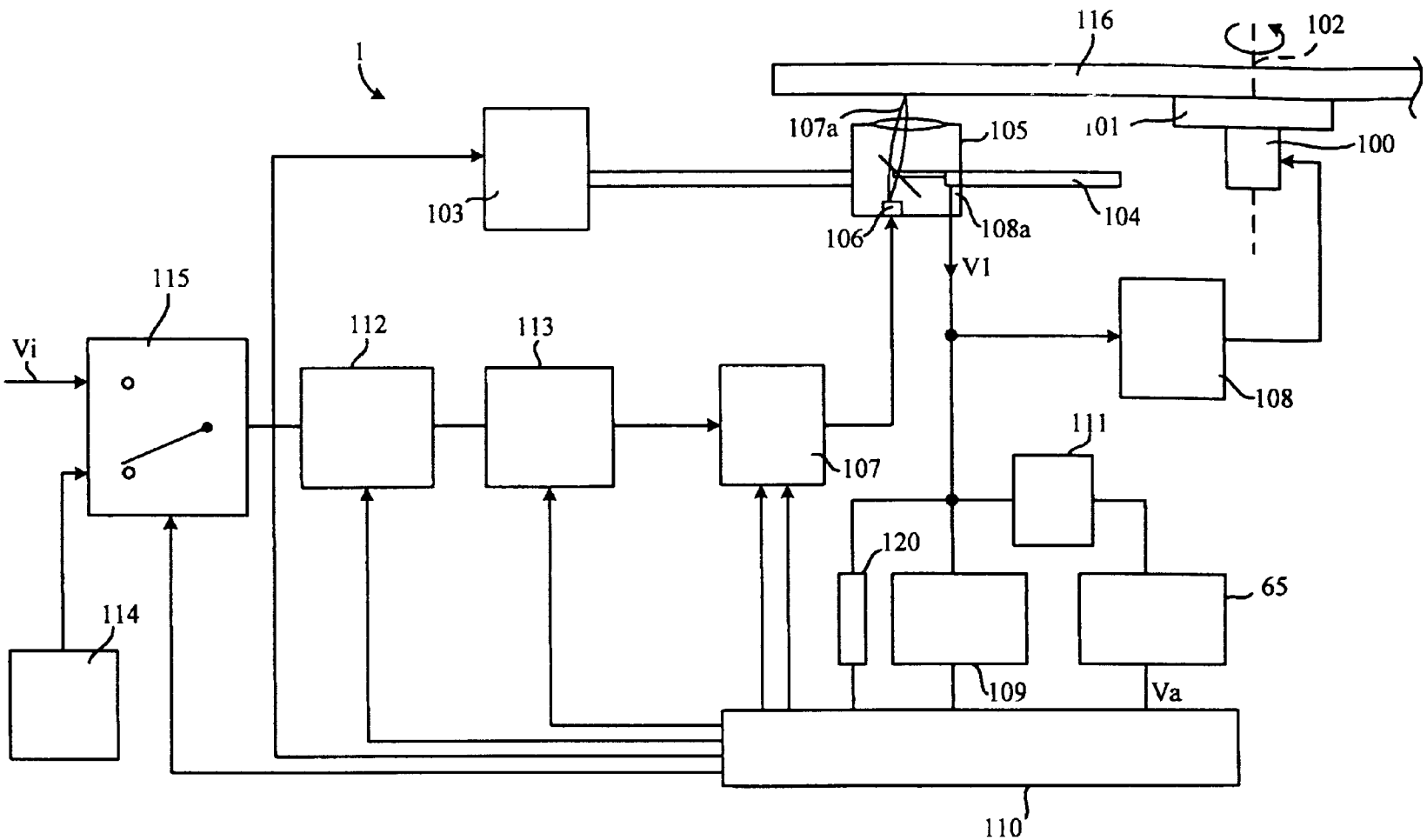
FIG. 1 (Prior art)

Referring to FIG. 1, the information recording apparatus 1 of a conventional type records optical signals (information patterns) of a suitable recording format, e.g. standard CD format or RDAT format, on an optical record carrier 116. The optical record carrier 116 may be of a type provided with a radiation-sensitive layer of, for example, a phase-change material or a dye. The record carrier 116 is provided with a servo track assisting the recording of the information patterns.

In general, the servo track of the record carrier 116 utilizes a track modulation approach usually implemented in form of a track-wobble. Typically, a wobbled pregroove is formed on the record carrier 116 as the track-wobble. In the track-wobble, the frequency is modulated in conformity with an address information signal in form of ATIP (absolute time in pregroove) codes.

A conventional optical read/write head 105 is arranged to read/write the record carrier 116 rotating along an axis 102.

The optical read/write head 105 selectively moves in a radial direction of the record carrier 116 by a conventional positioning device. As shown in FIG. 1, the position device may be, for example, in the form of a motor 103 and a axle 104. If desired, the read/write head 105 can be employed both for recording and for reading information patterns.

The read/write head 105 includes a semiconductor laser for generating a radiation beam 107a whose intensity is varied by a control circuit 107. In a known manner, the radiation beam 107a is aimed at the servo track of the record carrier 116. The radiation beam 107a is partly reflected from the record carrier 116, and then the reflected beam is modulated in conformity with the track-wobble, and, if an information pattern has been recorded, also in conformity with the information pattern. The reflected beam is directed toward a radiation sensitive detector 108a, which generates a read signal V1 corresponding to the beam modulation. The signal V1 includes a component produced by the track-wobble and the component has a frequency of approximately 22 kHz. By means of a motor control circuit 108 for controlling the motor 100, the motor speed is controlled so as to maintain the frequency of the component within the read signal V1 due to the track-wobble at substantially 22 kHz. The motor 100 and the turntable 101 together drive the record carrier 116 rotating along the axis 102. The read signal V1 is applied to a detection circuit 109. The detection circuit 109 derives the ATIP codes from the component in the read signal V1 associated with the track-wobble and applies ATIP codes to a processing unit including, for example, a microprocessor 110. Moreover, the read signal V1 is applied to an amplifier circuit 111 having a high-pass characteristics to reject the low-frequency signal component associated with the track-wobble. The signal output from the amplifier circuit 111 is applied to the analysis circuit 65 which indicates the quality of read information patterns. An embodiment of the analysis circuit 65 will be described hereinafter. The analysis signal Va output from the analysis circuit 65 is applied to the microprocessor 110.

The information recording apparatus 1 further includes a conventional CIRC (cross interleaved Reed-Solomon codes) encoding circuit 112 adapted to receive the signal Vi to be recorded by the information recording apparatus 1. In an embodiment, the signal Vi to be recorded is applied to CIRC encoding circuit 112 via a switch 115 which is controlled by the microprocessor 110. The CIRC encoding circuit 112 is arranged in series with a conventional EFM modulator 113. The EFM modulator 113 as its output connected to the driver circuit 107. The driver circuit 107 is of a conventional controllable type which selectively adjusts the parameters affecting the quality of the recorded information pattern. One parameter may be, for example, the intensity of the radiation beam during the formation of the information patterns. In the case that the information patterns are formed with radiation pulses of constant duration, this duration may be an important parameter of affecting the quality of the applied information pattern. On the other hand, in the case of magneto-optical recording system, the strength of the magnetic field present in the record-carrier area and scanned by the radiation beam may be an important parameter.

For the purpose of generating a test information pattern, the information recording apparatus 1 may include a test signal generator 114, which generates, for example, a random digital signal or generates a signal corresponding to the digital zero value signal, i.e. a digital silence condition. However, it is to be noted that the signal Vi can also be used to form the test information patterns. The signal generated by the test signal generator 114 is applied to the CIRC encoding circuit 112 via the switch 115. The switch 115, depending on the control signal from the microprocessor 110, selectively transfers either the signal Vi or the output signal of the test signal generator 114 to the CIRC encoding circuit 112. In addition, to detect a high-frequency signal component in the read signal V1, the information recording apparatus 1 may include a high-frequency detector 120 disposed between the read/write head 105 and the microprocessor 110.

The invention detects error-count or error-ratio occurred in reading ATIP codes to decide which storage units on the record carrier can not store data. Furthermore, the defected storage units are labeled as unrecordable. In addition, to enhance the reading reliability of the information patterns representative of data recorded on the storage units, the invention employs the reflected signal from the surface of the record carrier to detect the defect cause of the storage unit. Hereinafter, a single storage unit on the record carrier is taken to illustrate the spirit and characteristics of the invention.

Figure 2:
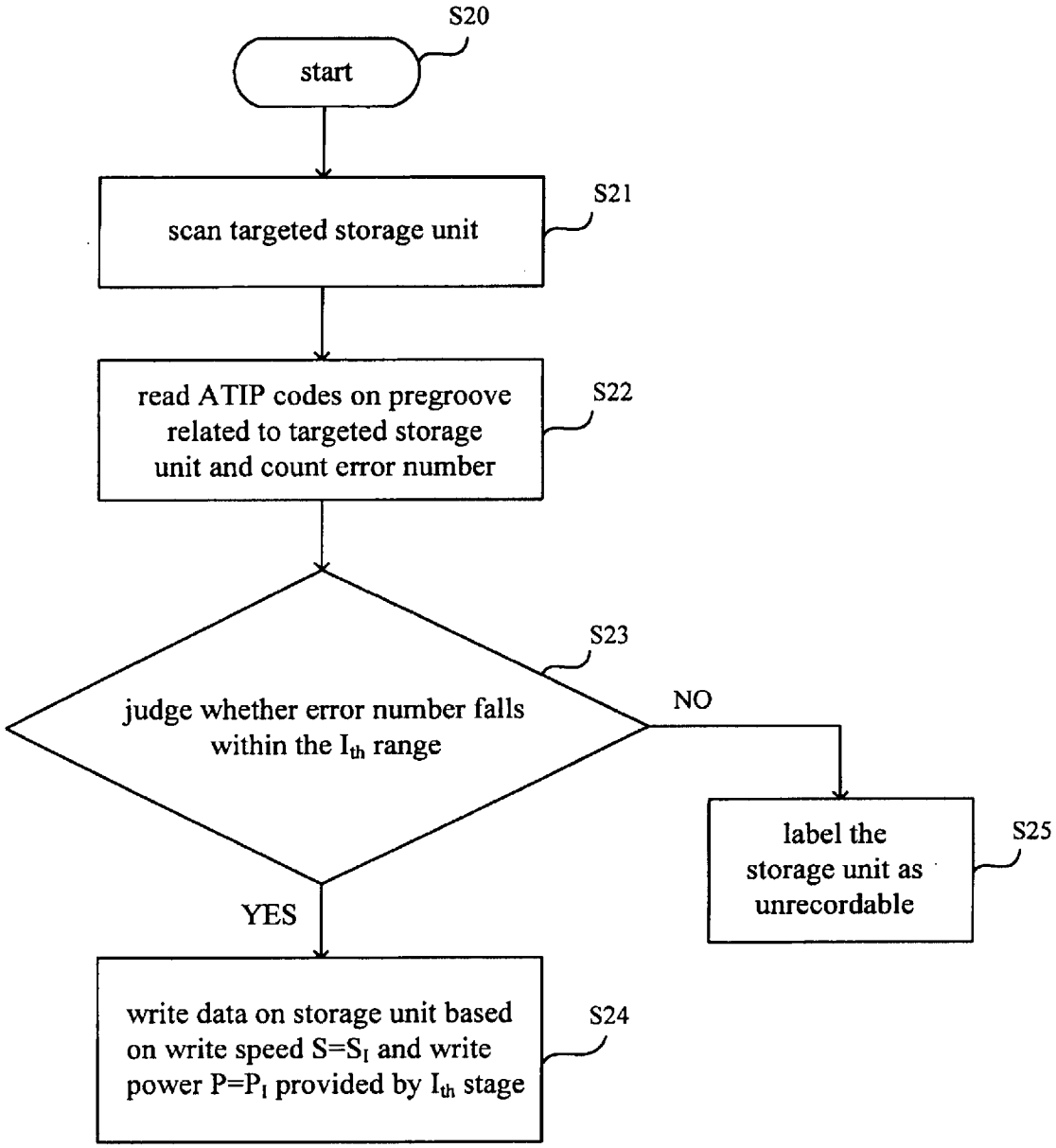
FIG. 2 is a flowchart showing a method according to a first preferred embodiment of the invention.

As recited above, the record carrier has a pregroove on which the predetermined ATIP codes are marked. Referring to FIG. 2 which disclosed a first preferred embodiment of the invention. In the first preferred embodiment, an error-count occurred in reading ATIP codes is employed to decide if the data are written to the storage unit. A predetermined sets of number-ranges are initially defined. Each set of number-range corresponds to a write speed (S) and a write power (P) used to write data on the storage unit. The step S20 is start point of the invention to define the predetermined sets of number-range. In step S21, the invention scans the storage unit. In step S21, the data on the pregroove corresponding to the storage unit are read and one error-count is generated by comparing the data obtained with the predetermined ATIP codes corresponding to the storage unit. In step S23, the invention decides whether the error-count obtained falls within one set of number-range and which set of number-range the error-count falls within.

If YES in step S23, step S24 is then performed to write the data on the storage unit based on the write speed S equaling to Si and the write power P equaling Pi. Si and Pi are respectively the write speed and write power corresponding to the set of number-range determined in the step S23. If NO in step S23, step S25 is then performed to label the storage unit as unrecordable.

Figure 3:
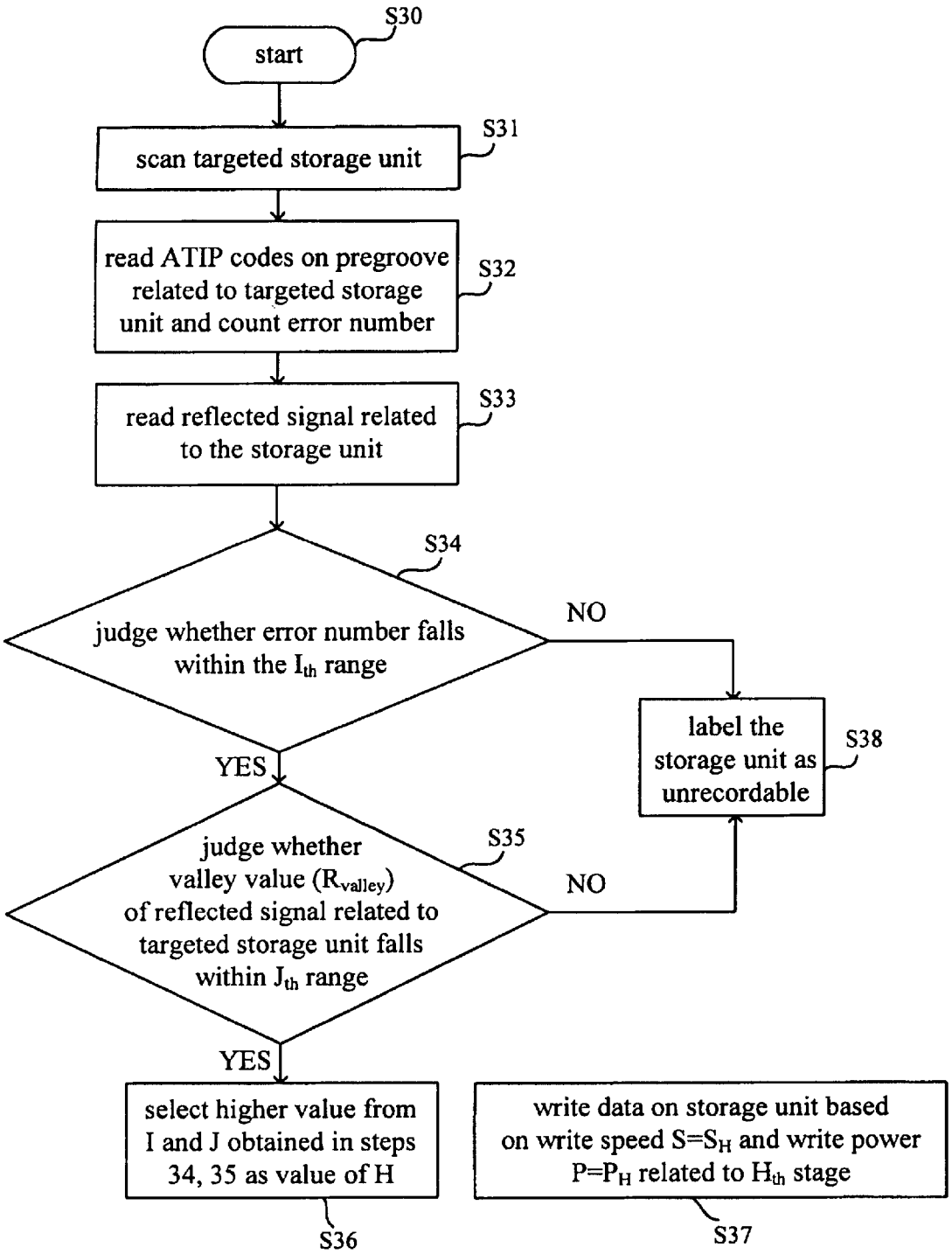
FIG. 3 is a flowchart showing a method according to a second preferred embodiment of the invention.

Referring to FIG. 3, a second preferred embodiment of the invention is disclosed. Same as the second embodiment, the record carrier has a pregroove on which predetermined ATIP codes are marked. However, in the second preferred embodiment, an error-count occurred in reading ATIP codes and the reflected signal are employed to decide if the data are written to the storage unit. According to the preferred embodiment, N stages are initially defined based on different writing speeds, where N is a positive integer. Each stage corresponds to a write speed and a write power used to write data on the storage unit and corresponds to a number-range and a reflected-signal range respectively.

At the start point, the step S30 is performed to define the N stages recited above. Afterwards, step S31 is performed to scan the storage unit is scanned. Afterwards, step S32 is performed to read the ATIP codes on the pregroove corresponding to the storage unit and generate the error-count by comparing the data obtained with the predetermined ATIP codes corresponding to the storage unit. The step S33 is performed to retrieve the reflected signal corresponding to the storage unit. The reflected signal obtained has a valley value, $R_{valley}$. The step S33 is performed to determine whether the error-count obtained in step S32 falls within the number-range corresponding to an Ith stage, where I is an integer ranging from 1 to N. If YES in step S34, step S35 is then performed. The step S35 is performed to determine if $R_{valley}$ falls within the reflected-signal range corresponding to a Jth stage, where J is an integer ranging from 1 to N. If No in step S35, step S38 is then performed. In step S38, the storage unit is labeled as unrecordable. If YES in step S35, step S36 is then performed. In step S36, the invention selects the higher value of I and J obtained in steps 34, 35 as value of H. That is, if I is greater than J, then H is equal to I, and vice versa. In step 37, the data are written on the storage unit based on the write speed and the write power corresponding to the Hth stage. If NO in step S34, step S38 is then performed to label the storage unit as unrecordable.

Due to the absorption and scattering by the surface of the record carrier over the radiation beam, the strength of the reflected radiation beam may be reduced. In order to enhance the reliability of the information patterns recorded, in another preferred embodiment, the optimum write power ($P_j$) used in step 37 has a value determined by the following equation:

$$P_J = P_H\sqrt{\frac{R_{av}}{R_{valley}}}$$

where $R_{av}$ represent the average value of the reflected signal corresponding to the storage unit, $P_H$ is the write power corresponding to the Hth stage.

Figure 4:
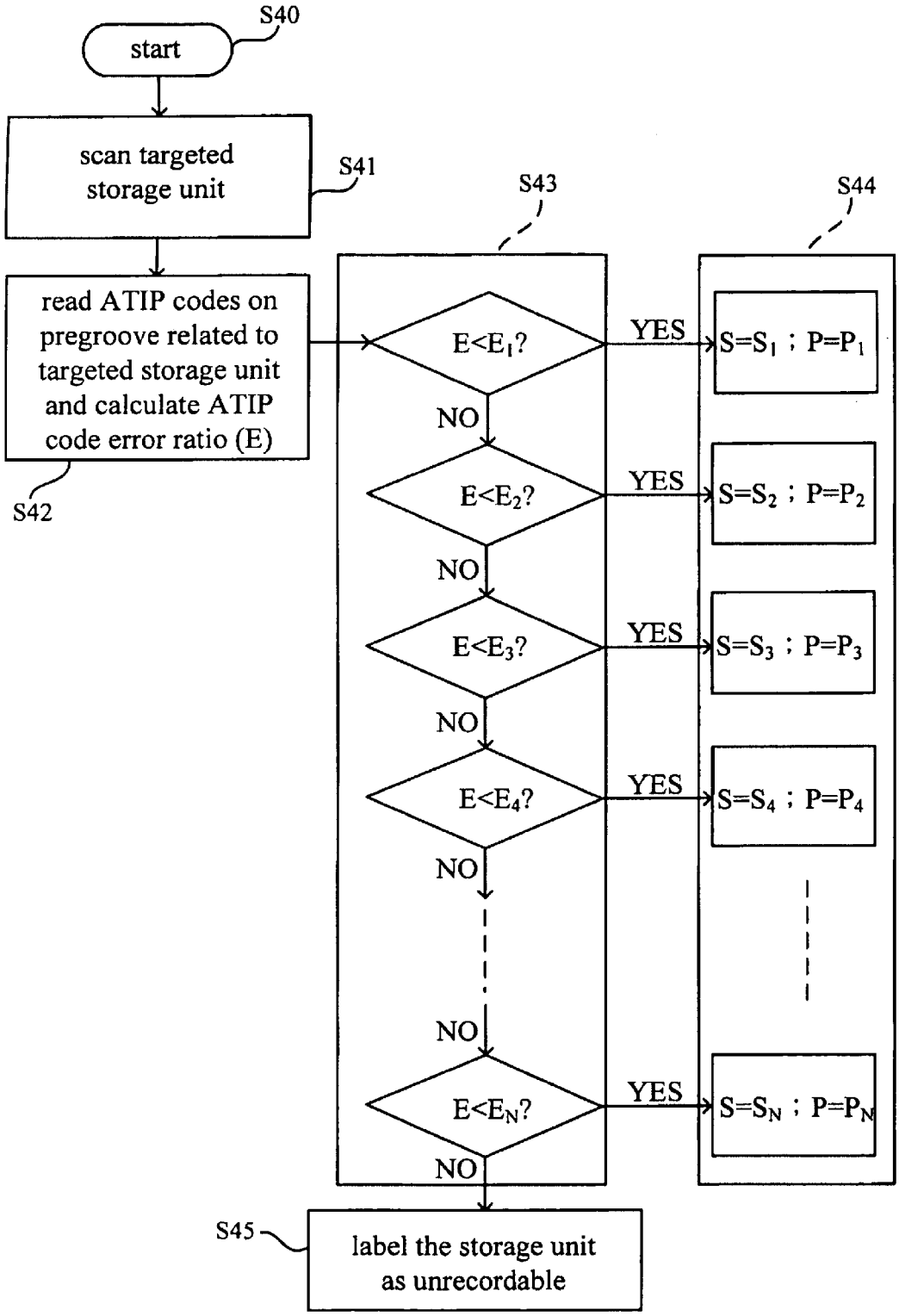
FIG. 4 is a flowchart showing a method according to a third preferred embodiment of the invention.

Referring to FIG. 4, a third preferred embodiment of the invention is disclosed. In the third preferred embodiment, an error-rate, E, occurred in reading ATIP codes is employed to decide the data write on the storage unit. According to the third preferred embodiment, N stages are initially defined, where N is positive integer number. For instance, Ith stage corresponds to an error-ratio threshold value ($E_I$), where I is an integer ranging from 1 to N, for determining the writing of data on the storage unit. Each stage also corresponds to a write speed and a write power used to write data on the storage unit. At the start point, step S40 is performed to define the N stages recited above. Afterwards, step S41 is performed. In step S41, the storage unit is scanned. Step S42 is then performed to read ATIP codes on the pregroove corresponding to the storage unit and the error-ratio is generated based on a predetermined formula recited hereinafter and the error-count obtained. As with the first or second embodiment recited above, the error-count is generated by comparing the data obtained with the predetermined ATIP codes corresponding to the storage unit. Step S43 is the performed. The step S43 decides if the error-ratio (E) obtained is lower than the threshold value ($E_I$) corresponding to the Ith stage, where I ranging from 1 to N. If YES in step S43, step S44 is then performed. In step S44, the data are written on the storage unit based on the write speed and the write power corresponding to the Ith stage, i.e. Si and Pi. If NO in step S43, step S45 is then performed. In step S45, the storage unit is labeled as unrecordable.

In one embodiment, in step S42, the error-ratio is calculated by the following equation:

$$\text{error-ratio} = \frac{\text{error-number}}{\text{storage unit}}$$

Figure 5:
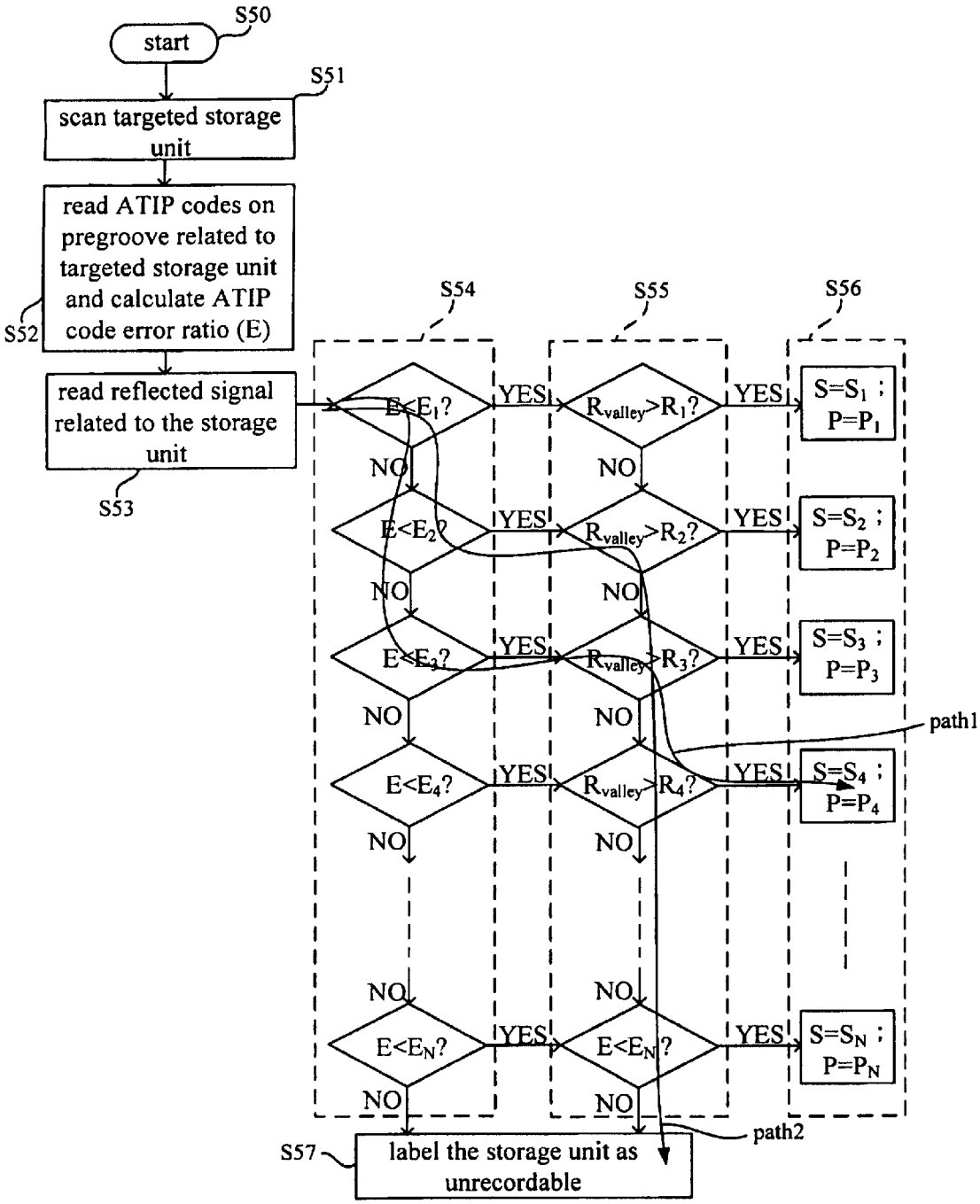
FIG. 5 is a flowchart showing a method according to a fourth preferred embodiment of the invention.

Referring to FIG. 5, a fourth preferred embodiment of the invention is disclosed. In the fourth preferred embodiment, an error-ratio (E) occurred in reading ATIP codes and a reflected signal are employed to decide the data write on the storage unit. According to the fourth preferred embodiment, N stages are initially defined, where N is a positive integer. Each Ith stage corresponds to a first threshold value (E1) and a second threshold value ($R_I$), where I is an integer ranging from 1 to N, for determining the writing of data on the storage unit. Each stage corresponds to a write speed S and a write power P used to write data on the storage unit. The first threshold value associates with the error-ratio and the second threshold value associates with the reflected signal.

At the start point of the invention, step S50 is performed to define the N stages recited above. Afterwards, step S51 is performed. In step S51, the storage unit is scanned. In step S52, the data on the pregroove corresponding to the storage unit are read and an error-ratio (E) is generated according to a predetermined formula. Step S53 is then performed to read the reflected signal corresponding to the storage unit. The reflected signal obtained has a valley value ($R_{valley}$). The step S54 decides whether the error-ratio (E) obtained in step S52 is less than the first threshold value (E) corresponding to the Ith stage, where I ranging from 1 to N. If YES in step S54, step S55 is then performed. The step S55 decides whether the valley value ($R_{valley}$) is higher than the second threshold value ($R_J$) corresponding to the Jth stage, where J is an integer ranging from 1 to N, I is obtained from Step S54. If No in step S54, step S57 is then performed. In step S57, the storage unit is labeled as unrecordable. If YES in step S55, step S56 is then performed. In step S56, the data are written on the storage unit based on the write speed and the write power corresponding to the Jth stage, where J is obtained in Step S55. If NO in step S55, step S57 is then performed to label the storage unit is unrecordable.

Two illustrative paths, i.e. path 1 and path 2 shown in FIG. 5, are used to explain the embodiment. Along the path 1, in step S54, the error-ratio (E) regarding the storage unit is determined to be less than the first threshold value (E3) corresponding to the third stage such that ($R_{valley}>R_3$?) in step S54 is then performed. Afterwards, along the path 1, in step S55, the valley value of the reflected signal regarding the storage unit is determined to be higher than the second threshold value (R4) corresponding to the fourth stage such that ($S=S_4$, $P=P_4$) in step S55 is then performed to write the data on the storage unit based on the write speed S and the write power P. Similarly, along path 2, in step S54, the error-ratio (E) regarding the storage unit is found to be less than the first threshold value (E2) corresponding to the second stage such that ($R_{valley}>R_2$?) in step S54 is then performed. Afterwards, in step S55, the valley value of the reflected signal regarding the storage unit is determined as being less than the second threshold values RN corresponding to the Nth stage. Therefore, step S57 is then performed to label the storage unit as being unrecordable.

Similarly, in order to enhance the reliability of the information patterns recorded, in another preferred embodiment, the optimum write power ($P_J$) used in step 56 has a value determined by the following equation:

$$P_J = P_H\sqrt{\frac{R_{av}}{R_{valley}}}$$

where $R_{av}$ represents the average value of the reflected signal corresponding to the storage unit, $P_H$ is the write power corresponding to the Hth stage decided in step S55.

In one embodiment, in step S52, the error-ratio is calculated by the following equation:

$$\text{error-ratio} = \frac{\text{error-number}}{\text{storage unit}}$$

To sum up, the current invention disclose the recording system for recording applied information onto the record carrier 116. The recording system comprises (a) the record carrier 116 and (b) the recording apparatus 1 assigned with a predetermined allow-to-record value.

The record carrier 116 is of an inscribe type (CD-R or CD-RW disk), as the ATIP FM modulation coding defined in Philips CD-RW standard "Orange Book", the record carrier comprises: (a) the preformed servo track intended for recording the applied information, and (b) the preconditioned control-information pattern indicating a control information, the control-information pattern taking the form of a preformed track modulation of the servo track.

The recording apparatus 1 is assigned with a predetermined allow-to-record value, and the recording apparatus 1 comprises: (a) the recording means (read/write head 105) for recording the applied information onto the servo track, (b) the reading means (read/write head 105) for scanning the servo track and deriving the control information from the scanned servo track modulation, (c) means (firmware stored in the microprocessor 110) for generating certain signal corresponding to the targeted storage unit of the servo track, and (d) control means (firmware stored in the microprocessor 110) for controlling the recording process. The signal generated by firmware can be either the error-count indicative for the number of errors is read, or the reflective signal value indicative for the strength of reflective signal.

The microprocessor 110 will make the applied information can be recorded onto the servo track only when the error-count of the targeted storage unit of the servo track is less than the predetermined allow-to-record value corresponding to each recording stage.

In practical application, before writing data on the storage units of the record carrier, the invention is employed to detect the defects of storage units and mark them as unrecordable. Furthermore, the recording setting, i.e. write speed and write power, of each storage unit are respectively determined. The configuration results obtained by the invention are recorded in a area, e.g. TOC (table of content), on the record carrier for future use.

What is claimed is:

1. A method for controlling a recording apparatus to record [a] *an* applied information on one of a plurality of storage units of a record carrier, in which the record carrier is provided with a preformed servo track, and said servo track is preconditioned with a control-information pattern, the plurality of storage units being arranged along said servo track, said method comprising the steps of:

(1) defining a plurality of recording stages based on [an] *a* number of errors occurred in a targeted storage unit, each recording stage being corresponding to a predetermined writing speed;

(2) reading the control-information pattern from the targeted storage unit;

(3) generating an error-count by calculating the number of errors *that* occurred in step (2);

(4) adjusting the writing speed of the recording apparatus to record the applied information to the targeted storage unit, according to one of the plurality of recording stages corresponding to the error-count[; and (5) stop recording applied information on the targeted storage unit, if none of the plurality of recording stages being corresponding to the error-count].

2. The method of claim 1, wherein each recording stage [being] further [corresponding] *corresponds* to a predetermined writing power in the step (1), and the writing [speed] *power* of the recording apparatus to record the applied information to the targeted storage unit is also adjusted in the step (4).

3. The method of claim 1, wherein the control-information pattern is formed as a FM modulation of wobble modulated code to indicate the absolute time of the servo track.

4. A method for writing data on a storage unit on a record carrier having a pregroove on which predetermined Absolute Time In Pregroove (ATIP) codes are marked, a predetermined sets of number-ranges being defined, each set of number-range corresponding to a write speed and a write power used to write data on the storage unit, said method comprising the steps of:

(1) reading data on the pregroove corresponding to the storage unit;

(2) generating an error-count by comparing the data obtained in step (1) with the predetermined ATIP codes corresponding to the storage unit;

(3) determining whether the error-count obtained falls within one set of number-range; and

(31) if No in step (3), labeling the storage unit as unrecordable;

(32) if YES in step (3), writing data on the storage unit based on the write speed and the write power corresponding to said one set of number-range.

5. The method of claim 4, further comprising a step of:

(4) writing the result of step (3) on an area on the record carrier.

6. A method for writing data on a storage unit on a record carrier having a pregroove on which predetermined Absolute Time In Pregroove (ATIP) codes are marked, N successive stages being defined, N being a natural number, each stage corresponding to a number-range and a reflected-signal range for determining the writing of data on the storage unit, each stage also corresponding to a write speed and a write power used to write data on the storage unit, said method comprising the steps of:

(1) scanning the storage unit, and reading a reflected signal corresponding to the storage unit and data on the pregroove corresponding to the storage unit, the reflected signal having a valley value ($R_{valley}$);

(2) generating an error-count by comparing the data obtained in step (1) with the predetermined [ATEP] *ATIP* codes corresponding to the storage unit;

(3) determining whether the error-count obtained falls within the number-range corresponding to the Ith stage of the N stages where I is an integer ranging 1 to N;

(31) if No in step (3), labeling the storage unit as unrecordable;

(32) if YES in step (3), determining whether the valley value ($R_{valley}$) falls within the reflected-signal range corresponding to the Jth stage of the N stage where J is an integer ranging from 1 to N;

(321) if NO in step (32), labeling the storage unit as unrecordable;

(322) if YES in step (32), writing data on the storage unit based on the write speed and the write power corresponding to the Jth stage.

7. The method of claim 6, further comprising a step of (4) writing the result of step (3) on an area on the record carrier.

8. The method of claim 7, an optimum writer power ($P_J$) corresponding to the Jth stage is used to write the data and is determined by the following equation:

$$P_J = P_H\sqrt{\frac{R_{av}}{R_{valley}}},$$

wherein $R_{av}$ represent the average value of the reflected signal corresponding to the storage unit, $P_H$ is the write power corresponding to the Jth stage.

9. A method for writing data on a storage unit on a record carrier having a pregroove on which predetermined Absolute Time In Pregroove (ATIP) codes are marked, N successive stages being defined where N is a natural number, each stage corresponding to a threshold value for determining the writing of data on the storage unit, each stage also corresponding to a write speed and a write power used to write data on the storage unit, said method comprising the steps of:

(1) reading data on the pregroove corresponding to the storage unit;

(2) generating an error-ratio regarding the comparison between the data obtained in step (1) with the predetermined ATIP codes corresponding to the storage unit;

(3) determining whether the error-ratio obtained is just lower than the threshold value corresponding to the Ith stage of the N stages where I is an integer ranging 1 to N; and

(31) if No in step (3), labeling the storage unit as unrecordable;

(32) if YES in step (3), writing data on the storage unit based on the write speed and the write power corresponding to the Ith stage.

10. The method of claim 9, further comprising a step of:

(4) writing the result of step (3) on an area on the record carrier.

11. The method of claim 10, wherein in step (2) an error-count is also generated by comparing the data obtained in step (1) with the predetermined ATIP codes corresponding to the storage unit, and the error-ratio is calculated by the following equation:

$$\text{error-ratio} = \frac{\text{error-number}}{\text{storage unit}}.$$

12. A method for writing data on a storage unit on a record carrier having a pregroove on which predetermined Absolute Time In Pregroove (ATIP) codes are marked, N stages being defined where N is a natural number, each stage corresponding to a first threshold value and a second threshold value for determining the writing of data on the storage unit, each stage also corresponding to a write speed and a write power used to write data on the storage unit, said method comprising the steps of:

)1) scanning the storage unit, reading a reflected signal corresponding to the storage unit and data on the pregroove corresponding to the storage unit, the reflected signal having a valley value ($R_{valley}$);

(2) generating an error-ratio regarding the comparison between the data obtained in step (1) with the predetermined [ATEP] *ATIP* codes corresponding to the storage unit;

(3) determining whether the error-ratio obtained is just lower than the first threshold value corresponding to the Ith stage of the N stages where I is an integer ranging 1 to N; and

(31) if No in step (3), labeling the storage unit as unrecordable;

(32) if YES in step (3), determining whether the valley value ($R_{valley}$) is just higher than the second threshold corresponding to the Jth stage where J is integer ranging 1 to N;

(321) if NO in step (32), labeling the storage unit as unrecordable;

(322) if YES in step (32), writing data on the storage unit based on the write speed and the write power corresponding to the Jth stage.

13. The method of claim 12, further comprising a step of:

(4) writing the result of step (3) on an area on the record carrier.

14. The method of claim 13, wherein an optimum writer power ($P_J$) corresponding to the Jth stage is used to write the data and is determined by the following equation:

$$P_J = P_H\sqrt{\frac{R_{av}}{R_{valley}}},$$

wherein $R_{av}$ represent the average value of the reflected signal corresponding to the storage unit, $P_H$ is the write power corresponding to the Jth stage.

15. The method of claim 13, wherein in step (2) an error-count is also generated by comparing the data obtained in step (1) with the predetermined ATIP codes corresponding to the storage unit, and the error-ratio is calculated by the following equation:

$$\text{error-ratio} = \frac{\text{error-number}}{\text{storage unit}}.$$

*16. A method of writing an applied information to a record carrier, the record carrier having a pregroove on which a predetermined control-information pattern are marked, said method comprising the steps of:*

*(1) scanning the record carrier and reading the control-information pattern;*

*(2) generating an error-count by calculating the number of errors occurred in step (1); and*

*(3) determining a writing speed to record the applied information to the record carrier according to the error-count.*

*17. The method of claim 16, further comprising:*

*(4) writing the applied information to a storage unit of the record carrier according to the writing speed.*

*18. The method of claim 17, wherein the control-information pattern is Absolute Time In Pregroove (ATIP) codes.*

*19. The method of claim 17, wherein the step (1) further comprises: reading a reflected signal corresponding to the storage unit, the reflected signal having a valley value ($R_{valley}$).*

*20. The method of claim 19, wherein the write speed and a write power for the storage unit are determined based on the valley value ($R_{valley}$) and the error-count.*

*21. The method of claim 20, N successive stages being predefined and N being a natural number, each stage being corresponding to a number-range and a reflected-signal*

*range for determining the writing speed and the writing power of the applied information on the storage unit, wherein the step of determining the write speed and the write power for the targeted storage unit based on the valley value ($R_{valley}$) and the error-count comprising:*

*determining whether the error-count falls within the number-range corresponding to the Ith stage of the N stages where I is an integer ranging 1 to N;*

*if the error-count falls within the number-range corresponding to the Ith stage, determining whether the valley value ($R_{valley}$) falls within the reflected-signal range corresponding to the Jth stage of the N stage where J is an integer ranging from 1 to N; and*

*if the valley value ($R_{valley}$) falls within the reflected-signal range corresponding to the Jth stage, the write speed and the write power corresponding to the Jth stage being used as the write speed and the write power for the storage unit.*

*22. The method of claim 21, if the error-count does not fall within the number-range corresponding to the Ith stage, labeling the storage unit as unrecordable.*

*23. The method of claim 21, if the valley valve ($R_{valley}$) does not fall within the reflected-signal range corresponding to the Jth stage, labeling the storage unit as unrecordable.*

* * * * *